C. J. DORFF.
ELECTRIC OUTLET BOX.
APPLICATION FILED JUNE 22, 1907.
905,998.
Patented Dec. 8, 1908.
2 SHEETS—SHEET 1.
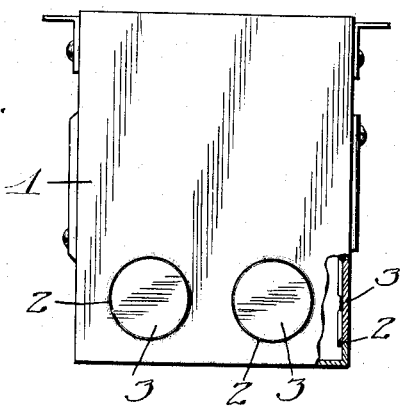
Fig. 1.
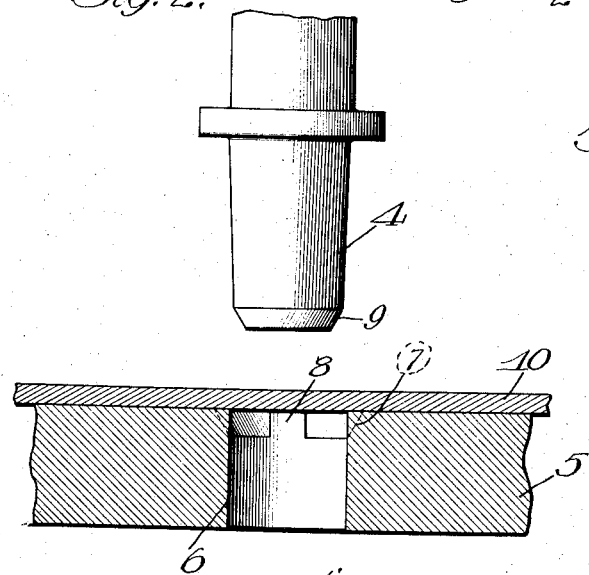
Fig. 2.
Fig. 3.
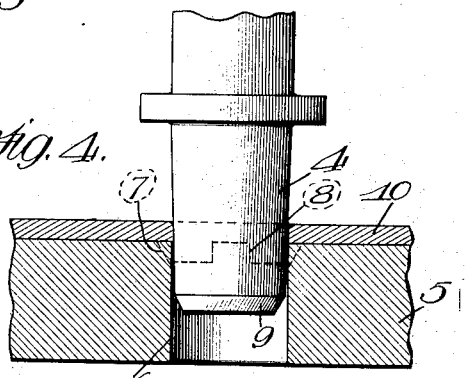
Fig. 4.
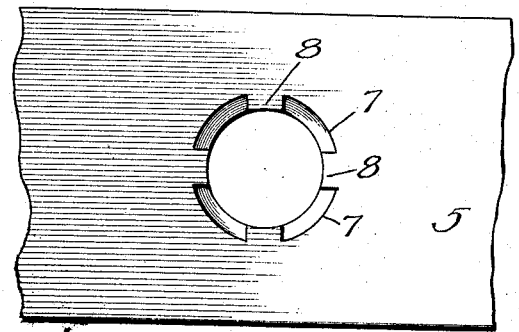
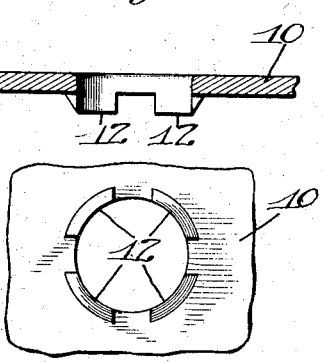
Fig. 5.
Fig. 6.
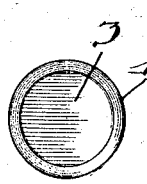
Fig. 7.
Witnesses:
Inventor:
Conrad J. Dorff
By Luther L. Miller
Atty

C. J. DORFF.
ELECTRIC OUTLET BOX.
APPLICATION FILED JUNE 22, 1907.

905,998.

Patented Dec. 8, 1908.

2 SHEETS—SHEET 2.

Witnesses:
Ba D. Perry
Robert H. Weir

Inventor:
Conrad J. Dorff
By Luther L. Miller
Atty.

UNITED STATES PATENT OFFICE.

CONRAD J. DORFF, OF CHICAGO, ILLINOIS, ASSIGNOR TO FREDERIC GREER, OF CHICAGO, ILLINOIS.

ELECTRIC OUTLET-BOX.

No. 905,998.  Specification of Letters Patent.  Patented Dec. 8, 1908.

Application filed June 22, 1907. Serial No. 380,189.

*To all whom it may concern:*

Be it known that I, CONRAD J. DORFF, a citizen of the United States, residing at Chicago, in the county of Cook and State of Illinois, have invented certain new and useful Improvements in Electric Outlet-Boxes, of which the following is a specification.

The object of this invention is the production of an improved means for closing an opening in such a manner that the opening may be readily cleared when desired.

The invention is herein shown as applied to outlet boxes for electric wiring and similar purposes, such boxes having conduit-receiving openings formed in their walls. The boxes are marked with the openings closed, and when the boxes are installed, such of the openings as are to be used are cleared by the workman, the remaining openings being left plugged.

Figure 8:
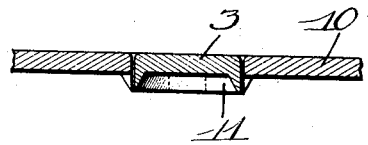
Figure 9:
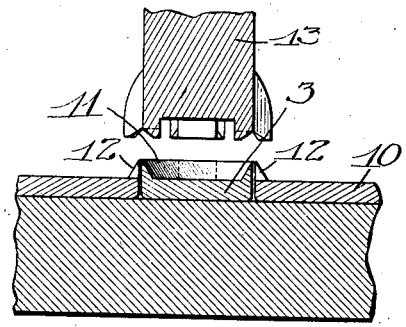
Figure 11:
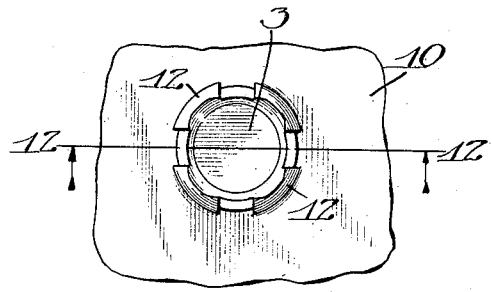
Figure 10:
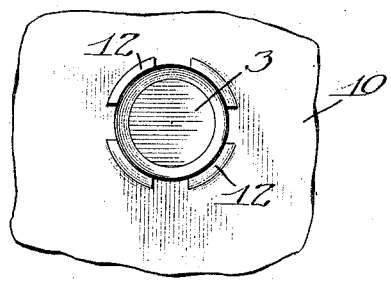
Figure 12:
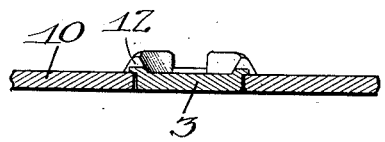
Figure 13:
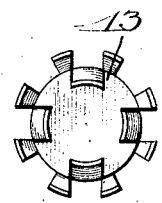

In the accompanying drawings, Figure 1 is a side elevation of an outlet box embodying the features of my invention. Fig. 2 represents a punch and die for forming the opening in the outlet box and the plug for closing said opening. Fig. 3 is a top plan view of said die. Fig. 4 is a view similar to that of Fig. 2 but showing the plug punched from the plate. Fig. 5 is a section through the plate after the formation of the opening. Fig. 6 is a face view of said plate. Fig. 7 is a face view of the plug. Fig. 8 is a sectional view of the plug reinserted in the plate. Fig. 9 represents a clenching punch in position to secure the plug in its opening. Fig. 10 is a top plan view of the plate and plug as shown in Fig. 9. Fig. 11 is a top plan view of said parts after the clenching operation. Fig. 12 is a section on line 12—12 of Fig. 11. Fig. 13 is a view of the bottom of the tool shown in Fig. 9.

Referring to the drawings, 1 indicates an outlet box, the walls of which are provided with a plurality of conduit-receiving openings 2, said openings being closed by the slugs 3 which were punched from the metal in forming the openings. For making the openings 2 I employ a punch 4 and a die 5. Said die has an opening 6 therein, the upper ends of the walls of which are beveled, as shown at 7. A plurality of teeth 8 extend inwardly from said beveled walls. The punch 4 is made tapering, and its lower end 9 is tapered at a greater angle than the portion above it, forming a face at the extreme end of said punch of smaller area than the area of the lower end of said first-mentioned tapered portion. When a slug is being punched from a blank 10 said face will be sunk into the metal, raising an annular peripheral fin 11 upon said slug. The portions of the blank lying over the beveled surfaces 7 on the die 5 will be carried downward into contact with said surfaces, forming raised portions 12 upon the under side of the blank. Said raised portions virtually constitute a notched fin surrounding the opening. The punch 4 is made tapering so that after the slug has been forced from the blank, the opening will be enlarged by the punch during the latter part of its downward movement.

When closing the opening 2, the slug 3 is placed in said opening with the fin 11 at the same side of the blank as the raised portions 12, as shown in Fig. 8. More or less of the parts of the fin 11 lying opposite the open spaces between the ends of the raised portions upon the blank 10 are then bent outward to overlie the edge of the opening 2, and all or a part of each of the raised portions 12 is forced inwardly to overhang said slug, as shown in Figs. 11 and 12. The fin 11 and raised portions 12 may be thus bent by any suitable means, as, for example, the clenching punch 13 shown in Figs. 9 and 13, said punch having surfaces adapted to bend portions of the raised portions 12 inward, and portions of the fin 11 outward. I have herein shown only the ends of the raised portions 12 bent inward, but it will be obvious that the whole of each of said portions 12 might be thus bent.

I do not depend upon friction as a securing means for the slug, for it has been found that friction between the slug and the walls of its opening is variable in amount and efficiency, depending upon the condition of the tools, the manner of working, etc. On the contrary, I entirely eliminate friction as a securing means by making the slug smaller than its opening, and positively securing the slug in its opening by the clenched portions 11 and 12, as described. The clenched portions of the fin 11 prevent displacement of the slug in one direction, and the overhanging corners of the portions 12 prevent movement of the slug in the opposite direction.

Making the slug smaller than its opening also facilitates insertion of the slug.

The securing means herein shown for the slug 3 is strong enough to prevent said slug from being knocked or shaken out of its opening by the jars and rough treatment incidental to transportation and installation, but when it is desired to clear the opening the slug may be readily driven therefrom by means of a hammer or other suitable tool.

It is obvious that various changes may be made in the embodiment herein illustrated without departing from the spirit and scope of the invention, wherefore I desire to have it understood that I do not limit myself to the precise details herein set forth.

I claim as my invention:

1. An electric outlet box having an opening therein and a raised portion near said opening, a plug lying in said opening, said plug having a portion overlying the edge of said opening to positively prevent displacement of said plug in one direction, the raised portion on said box being bent to overlie said plug to positively prevent displacement of said plug in the opposite direction.

2. An electric outlet box having an opening therein, a plug lying in said opening and smaller in diameter than said opening, and interlocking means on said box and said closing member for positively locking said member in said opening.

3. An electric outlet box having an opening therein, a plug lying in said opening and smaller in diameter than said opening, and interlocking metallic means overlying said plug and said box for positively securing said plug in said opening.

4. An electric outlet box having an opening therein, a member lying in said opening and smaller in diameter than said opening, and interlocking bent overhanging locking portions on said box and said closing member for positively holding said closing member in said opening.

5. A member having an opening therein, a plug lying in said opening and having a peripheral fin, portions of which fin are bent to overlie the edges of said opening, and raised portions on said member bent to overlie said plug.

6. A member having an opening therein, a notched fin integral with said member and surrounding said opening, a member lying in said opening, and a peripheral fin integral with said second mentioned member, portions of said peripheral fin being bent outwardly, and portions of the fin on the first mentioned member being bent inwardly.

7. An electric outlet box having an opening therein and a plug for closing said opening, struck-up flanges at the edge of the opening in the outlet box, and struck-up flanges at the edge of the plug, the flanges on the plug alternating with those on the outlet box, the flanges on the outlet box overlapping the plug, and the flanges on the plug overlapping the outlet box.

CONRAD J. DORFF.

Witnesses:
L. L. MILLER,
GEORGE L. CHINDAHL.